Figure 7:
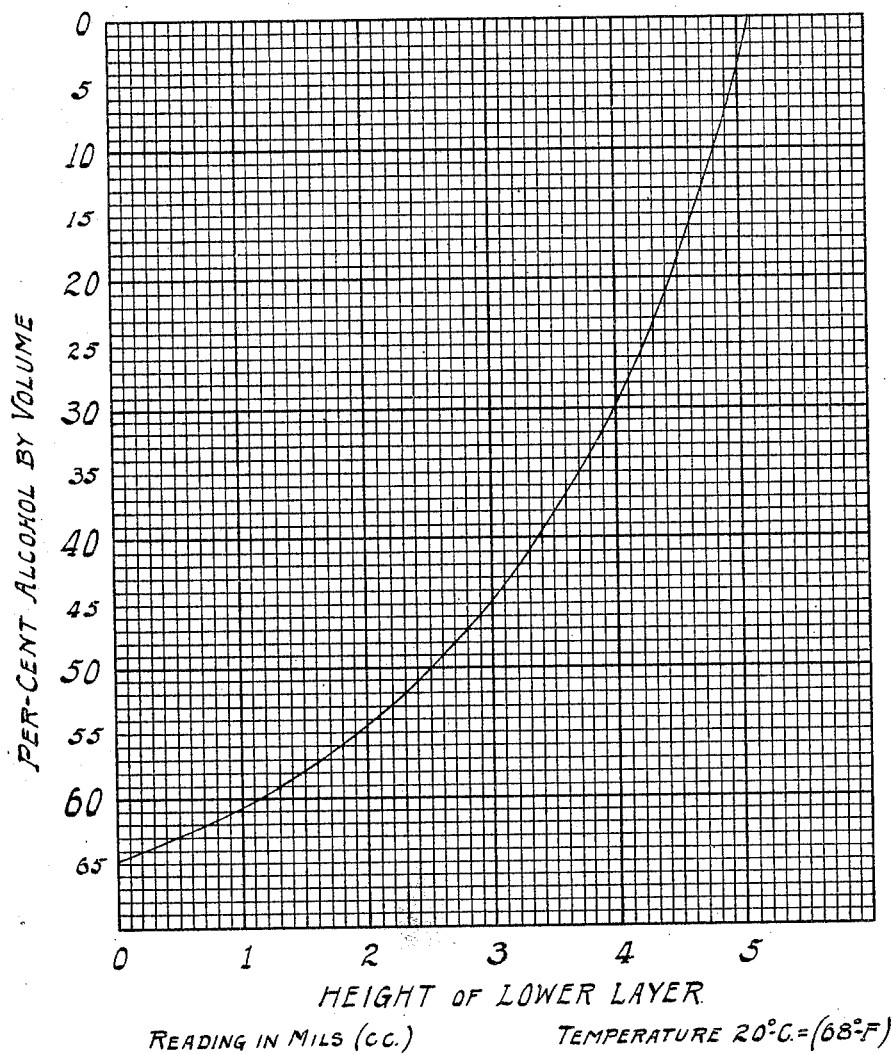

Oct. 30, 1928.　　　　　　　　　　　　　　　　　　　　1,689,901
J. F. WILLIAMS
PROCESS TO DETERMINE THE ALCOHOL AND THE COLOR IN ALCOHOLIC LIQUIDS
Filed July 30, 1926　　　　2 Sheets-Sheet 1
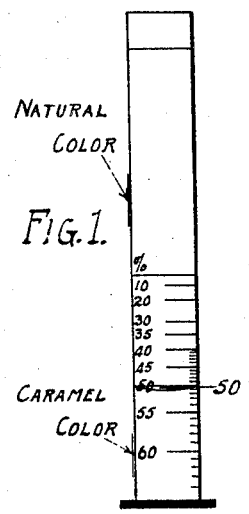
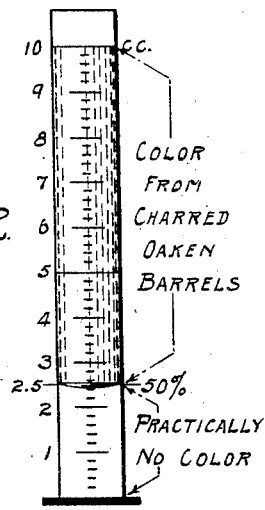
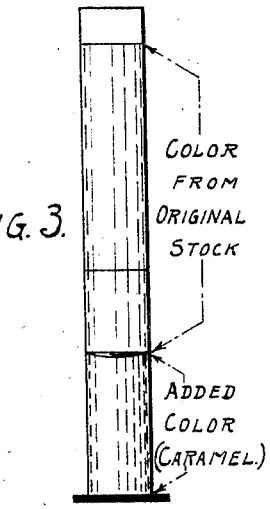
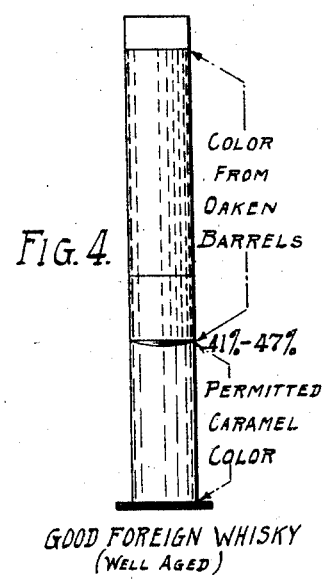
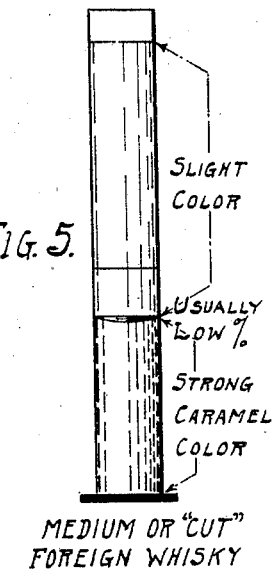
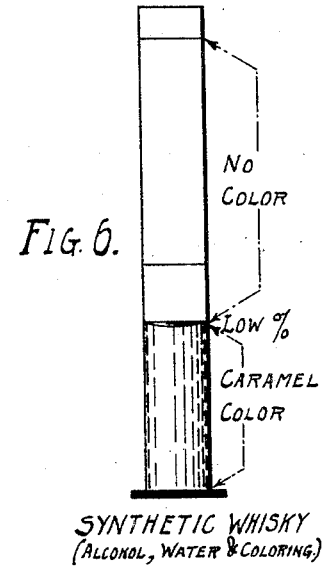
INVENTOR
John F Williams Oct. 30, 1928.   1,689,901
J. F. WILLIAMS
PROCESS TO DETERMINE THE ALCOHOL AND THE COLOR IN ALCOHOLIC LIQUIDS
Filed July 30, 1926   2 Sheets-Sheet 2

Patented Oct. 30, 1928.

1,689,901

UNITED STATES PATENT OFFICE.

JOHN F. WILLIAMS, OF BUFFALO, NEW YORK, ASSIGNOR OF ONE-THIRD TO CARROLL J. ROBERTS AND ONE-FIFTEENTH TO LUCIAN C. JACKSON, BOTH OF BUFFALO, NEW YORK.

PROCESS TO DETERMINE THE ALCOHOL AND THE COLOR IN ALCOHOLIC LIQUIDS.

Application filed July 30, 1926. Serial No. 125,935.

This invention relates to methods and apparatus for using a test reagent which will determine the percentage of alcohol in alcoholic liquids, as fermented and distilled spirits and the hydroxides of organic radicals, and at the same time determine the natural and artificial color in the same as for instance in whisky.

My main object is to furnish a simple process or method that requires no especial skill for making a quick, reliable and an easily understood determination of the alcohol in alcoholic liquids and also at the same time to determine the natural and artificial color in same.

Another object is to furnish a process which can be used by a chemist or layman after a few minutes instruction.

Another object is to furnish a method and means, which together with a test reagent will form a complete testing outfit for the purposes mentioned; which is easily portable; and by which tests can be quickly made away from a laboratory for the proof and purity of spirits or to check up analytical results.

Another object is to furnish a method and apparatus for determining alcohol and color which will take the place of the more expensive and time consuming laboratory methods and at a small cost, and also where only a small sample, as for instance less than one ounce, is available.

With these objects in view, the invention consists in a certain novel process and apparatus by which the said objects and certain other objects which will hereinafter appear are attained, the invention being more particularly pointed out in the claims.

This test is not a precision method and it is not intended that this method with the apparatus and the reagent (which said reagent is the subject of a co-pending application for patent and to which reference is made) will be a complete substitute or can entirely take the place of the regular laboratory methods where it is desirable to know the percentage of alcohol in small fractions of one per cent. But it furnishes a check for the laboratory method and its use is indicated where a sample is too small for convenient use with a hydrometer set, or pycnometer and balance or where these instruments are not available as outside of the laboratory.

The present standard method of testing distilled liquors in the laboratory for the percentage of alcohol is to weigh or measure a sample from which the alcohol is distilled and its specific gravity obtained by means of a pycnometer or a hydrometer. The corresponding percentage of alcohol in the distillate is obtained from a table and from the amount of the distillate and the sample the percentage of alcohol is calculated. This process requires accurate technical knowledge and considerable time.

The color test is then a separate matter by using 20 cc. of a Marsh reagent to 25 cc. of a solution made up from a sample which has been evaporated and then dissolved in water and alcohol added.

The Marsh reagent is composed of 100 cc. of pure amyl alcohol, 3 cc. of sirupy phosphoric acid and 3 cc. of water.

These present standards are obtained from "Methods of Analysis of the Association of Official Agricultural Chemists, second edition, revised to July 1, 1924."

My process for testing an alcoholic liquid for alcohol and coloring mater depends upon the fact that a special reagent described in my co-pending patent application 126,738 filed August 2, 1926, extracts and takes up the alcohol from the said liquid leaving an aqueous residuum as a lower layer. The apparatus for testing the liquid is described below and is preferably a cylinder where the height of the said lower layer of aqueous residuum can be read directly as an alcoholic percentage or where said reading can be translated by means of a table or curve. At the same time the natural coloring matter is shown in the oil reagent at the top and the artificial coloring matter is shown in the equeous residuum at the bottom. The color in the reagent or in the residuum can simply be noted as "natural" or "artificial" and the approximate shade, to see if the liquid had coloring matter added and the amount, or a comparison and a calculation of percentage can be made as in the usual tests.

In the drawings accompanying and forming a part of this specification, Figure 1 is an elevation of a receptacle in the shape of a cylinder, tube or graduate marked off according to my method and which will give a percentage reading direct and showing a reading for standard U. S. whisky.

Fig. 2, is an elevation of an ordinary 10 cc. cylinder marked in the regular way and showing a reading for standard U. S. whisky.

Figs. 3, 4, 5 and 6 are elevations of cylinders to show the results of my process in testing "cut" U. S. whisky, good foreign whisky, medium or "cut" foreign whisky and synthetic whisky, respectively. Fig. 7 is a curve to be used in reading percentages where a tube as in Fig. 2 is used.

In Fig. 1 the cylinder which is marked to read alcohol percentages direct according to my method, can be any size desired but is preferably between five and six inches in height and with an inside diameter of about three-eighths of an inch as being a size convenient to carry in the pocket. This tube together with an ounce bottle of my reagent forms the complete testing outfit.

The division lines marked with the figures 10, 20, etc. as per-centages as shown in Fig. 1, are preferably etched one-half way around the cylinder while longer lines are marked for the two divisions as 5 cc. and 10 cc. The 5 cc. line is one-half the distance from the bottom of the cylinder to the 10 cc. line. The percentage lines are spaced about as shown in the drawing, i. e. the distances between the lines increase toward the bottom of the cylinder as the percentage readings become larger. In the upper space between the figures 5 cc. and 10 cc. is etched the words "Natural color" and below 5 cc. the words "Caramel color".

The cylinder is preferably of glass and glass stoppered and should be frequently cleaned when in use so as to insure good results.

My special oil test reagent as described in my co-pending patent application is made up as follows:

Amyl alcohol (fusel oil)____ 70 mils (cc.)
Toluene C. P_____ 28 mils
Tartaric acid (50% aqueous solution)_____ 2 mils My process is as follows:

Using a cylinder as shown in Fig. 1, thoroughly clean the cylinder and rinse with the sample, then into the cylinder place exactly 5 cc. of the sample, and add 5 cc. of the reagent. The temperature before mixing should be approximately 20° C. (68° F.). The tube is gently inverted six to eight times, then rotated slowly and allowed to stand until the layers separate, then the height of the lower layer read in percentage. The tube should again be inverted, the layers allowed to separate, and the reading repeated. If any difference is noted in the two readings a third reading should be taken as a check.

Should an emulsion form it will discharge itself on standing. To hasten this condition, however, the cylinder may be rotated gently for a few seconds. Or, after partial separation has taken place, the emulsion may be discharged at once by gently warming the cylinder a few degrees, but returning to 20° C. before accepting the reading. By gently mixing the liquids an emulsion is not likely to form.

Droplets of water adhering to the sides of the cylinder, because of presence of dirt or grease, may be forced down by suddenly rapping the cylinder with a pencil, but is an indication that the cylinder should be more carefully cleaned.

The cylinder or graduate should be in a vertical position when read and in taking the reading, the middle meniscus should be used as it most accurately represents the exact volume of the lower layer. The middle meniscus is less variable when it changes after the reagent is added, as the final meniscus is almost a straight line.

Where the tube used is one marked with equal divisions as an ordinary 10 cc. tube the percentage of alcohol may be obtained from the table below, or from the curve (Fig. 7) which has been plotted from the values in the table.

Table

| Reading height of lower layer (cc.) | Alcohol % by volume | Reading height of lower layer (cc.) | Alcohol % by volume |
|---|---|---|---|
| 0.0 | 65.0 or over | 2.5 | 50.0-(100 proof) |
| .5 | 63.0 | 2.6 | 49.0 |
| 1.0 | 60.5 | 2.7 | 48.0 |
| 1.1 | 60.0 | 2.8 | 47.0 |
| 1.2 | 59.5 | 2.9 | 46.0 |
| 1.3 | 59.0 | 3.0 | 45.0 |
| 1.4 | 58.5 | 3.1 | 44.0 |
| 1.5 | 58.0 | 3.2 | 43.0 |
| 1.6 | 57.0 | 3.3 | 41.5 |
| 1.7 | 56.5 | 3.4 | 40.0 |
| 1.8 | 56.0 | 3.7 | 35.0 |
| 1.9 | 55.0 | 4.0 | 30.0 |
| 2.0 | 54.5 | 4.2 | 25.0 |
| 2.1 | 53.5 | 4.4 | 20.0 |
| 2.2 | 52.5 | 4.6 | 15.0 |
| 2.3 | 52.0 | 4.8 | 10.0 |
| 2.4 | 51.0 | 5.1 | 0.0 |

The curve is used as follows:

The height of the lower layer in the tube, as 2.5 is located on the lower horizontal line below the curve, following up a vertical line to the curve, then following the horizontal line to the vertical line on the left of the chart the reading as 50 indicates the percentage of alcohol in the sample.

Referring to Figs. 1 and 2, standard U. S. medicinal whisky should show 50% alcohol by volume or 100% proof with all color from charred oaken barrels in the top layer with practically no color in the lower layer. In "cut" U. S. whisky (Fig. 3) there will be some color in the top layer from the original stock but reduced in density according to the amount of original stock in the mixture while added color or caramel will show in the bottom layer and in a percentage to make up for the reduced color in the original stock. The percentage of alcohol will be usually less than 50% as shown in Fig. 3.

In Fig. 4 is shown a test for good foreign whisky in which a small amount of artificial color is permitted. The color from oaken barrels may be about the same as for standard U. S. whisky and shows in the upper layer while the amount of caramel shows in the lower layer. The alcohol content will run from 41% to 47%.

In Fig. 5 for medium or "cut" foreign whisky there will be a slight color in upper layer and a strong caramel color in lower layer with usually a low alcohol %.

In Fig. 6 for synthetic whisky (made from alcohol, water and coloring) no color will show in the upper layer, all color in the lower layer and with varying percentages of alcohol but usually low.

In reference to the temperature at which the tests for alcohol by this method are made it is not a difficult matter to keep such temperature within 1° or 2° from 20° C. and within these limits, the error will not be appreciable. It has been found that using a solution of 50% alcohol by volume, a temperature of 10° C. gave a reading of alcohol as 48.6% or 1.4% low, while a temperature of 30° C. gave a reading of alcohol as 51.4% or 1.4% high. The effect of temperature change however is less than that on the alcohol hydrometer method as this same temperature change by the hydrometer method has been found to make readings over 3½% low or high according as the temperature was 10° C. low or high, which is a difference of over 2½ times greater than by my oil test method.

The effect of the presence of 5% of glycerine or of 5% of cane sugar on a solution of 50% alcohol by volume has been found to make a reading in the case of the glycerine of 50.3% and in the case of the cane sugar of 50.1% which is not important.

The method is applicable to the distillates from wines and cordials, and to the concentrated distillates from vinegar, near-beer, ale, cider, etc.

In the case of liquors having a low alcoholic content, say under 10%, a laboratory method is as follows:

Distill 100 mils of the sample very slowly, collecting 20 mils, apply the test to 10 mils of the distillate, and divide the percentage of alcohol thus obtained by 5.

Having thus described my invention, I claim:

1. A process for determining the alcohol in an alcoholic liquid which consists essentially of mixing a sample of said liquid and a reagent which includes an amyl alcohol and toluene in a graduated receptacle, whereby the alcohol in said liquid is taken up by said reagent and the percentage determined by the amount of residuum left from said sample.

2. A process for determining the alcohol in an alcoholic liquid, which consists essentially of mixing equal parts of a sample of said liquid and a reagent containing an amyl alcohol and a hydrocarbon of the aromatic series in a graduated receptacle, whereby the alcohol in said liquid is extracted and the percentage determined by the amount of residuum left from said sample.

3. A process for determining the alcohol in alcoholic liquids, which consists of mixing a sample of said liquids and a reagent containing fusel oil and toluene, whereby the alcohol in said liquid is extracted and the percentage determined by the amount of residuum left from said sample.

4. A process for determining the alcohol in alcoholic liquids, which consists of introducing a reagent containing an acidified mixture of fusel oil and toluene into a sample of said liquids, whereby the alcohol in said sample is extracted and taken up by said mixture and the percentage determined by the amount of residuum left in a lower layer.

5. A process for determining the alcohol in alcoholic liquids, which includes introducing a reagent containing fusel oil about 70 parts, toluene about 28 parts and an aqueous solution of tartaric acid about 2 parts all by volume, into a sample of said liquids for extracting and taking up the alcohol in said sample and leaving a residuum from which is determined the amount of alcohol in said sample.

6. A process for determining the alcohol and color in an alcoholic liquid, which includes introducing a reagent containing fusel oil, toluene and an acid into a sample of said liquid for extracting and taking up the alcohol and natural color in said liquid and leaving a residuum which holds the artificial color, and from the amount of which the percentage of alcohol extracted may be determined.

7. A process for determining the alcohol and color in alcoholic liquids, which consists of rinsing a clean graduated receptacle with a sample of an alcoholic liquid to be tested, placing a portion of said sample into said receptacle and adding an equal amount of a reagent, said reagent being an acidified mixture of an amyl alcohol and a hydrocarbon of the aromatic series, the temperature of said liquids being maintained at approximately 20° C., then mixing said liquids and allowing to stand, whereby the alcohol and natural color in said sample is extracted and taken up and leaving a residuum with the artificial color and whereby the percentage of said alcohol is determined from the amount of said residuum.

8. A process for the purpose set forth, which includes introducing a reagent containing fusel oil, toluene and tartaric acid into an alcoholic liquid.

9. A process for the purpose set forth, which consists of introducing a reagent having an amyl alcohol, a hydrocarbon of the aromatic series and an acid into an alcoholic liquid.

In testimony whereof I have signed my name to this specification.

JOHN F. WILLIAMS.